United States Patent [19]

Morales

[11] Patent Number: 5,291,554
[45] Date of Patent: Mar. 1, 1994

[54] SHARED-PRICE CUSTOM VIDEO RENTALS VIA INTERACTIVE TV

[75] Inventor: Fernando Morales, Reston, Va.
[73] Assignee: TV Answer, Inc., Reston, Va.
[21] Appl. No.: 932,257
[22] Filed: Aug. 19, 1992

Related U.S. Application Data

[63] Continuation-in-part of Ser. No. 889,626, May 28, 1992.
[51] Int. Cl.$^5$ .............................................. H04N 7/167
[52] U.S. Cl. ........................................ 380/5; 380/10; 380/23
[58] Field of Search .............................. 380/5, 10, 23

[56] References Cited

U.S. PATENT DOCUMENTS

| | | |
|---|---|---|
| 4,866,770 | 9/1989 | Seth-Smith et al. . |
| 4,890,320 | 12/1989 | Monslow et al. ........................ 380/5 |
| 4,890,321 | 12/1989 | Seth-Smith et al. . |
| 4,891,633 | 1/1990 | Imazeki et al. ........................ 380/5 |
| 5,016,272 | 5/1991 | Stubbs et al. ............................ 380/5 |
| 5,101,267 | 3/1992 | Morales-Garza . |

*Primary Examiner*—David C. Cain
*Attorney, Agent, or Firm*—Laurence R. Brown

[57] ABSTRACT

Movies and like video programs are distributed electronically from a program storage and processing center in encrypted format over a satellite channel upon custom order for private viewing of one paying subscriber or a small group of subscribers. Thus, charges may be shared to lower the processing, transmission and royalty costs involved for custom rental of unscheduled programs available from a large storage library facility. The transactions for ordering, paying and receiving a decryption key are made over a two-way interactive wireless satellite network in communication with a nationwide network of subscribers and the video program storage and distribution center. Software controlled subscriber stations permit the monitoring and control of the private viewing conditions to meet various copyright and recording criteria. The transmission is preferably in digital format, and thus may be easily stored in encrypted format for a single private viewing session at a time chosen by the subscriber. The interactive network provides optimal communication of catalog choices, pricing, delivery conditions, automated storage, viewing schedules, payment, confirmation of orders, and conformation to change in business procedures or delivery conditions. Thus, special purpose single-shot local control software may be downloaded from an interactive network processing center to the ordering subscriber station for implementing an order for a private viewing session of a desired movie or other video program.

15 Claims, 5 Drawing Sheets

| CATALOG MENU | PROGRAM SCHEDULE | PROGRAM SCHEDULE |
|---|---|---|
| P13 GONE WITH THE WIND | PENDING | GONE WITH THE WIND |
| 3 HRS 45 MIN. | GONE WITH THE WIND | CH 49 AUG. 13 92 |
| X VCR COPY $75.00 MORE | (564) EST AUG 15 92 | 7 45 PM LIVE ONLY |
| A SOLO $300.00 | | |
| B 12 $30.00 | SCHEDULED | _____ |
| S 125 $3.00 63 | | _____ |
| | OLYMPICS SEPT 18 22 92 | _____ |
| DATE ___ TIME ___ | CH 42 FULL TIME | |
| ___ | _____ | |
| ___ | _____ | |
| A | B | C |

FIG. 5

SHARED-PRICE CUSTOM VIDEO RENTALS VIA INTERACTIVE TV

This is a continuation-in-part of the co-pending application Ser. No. 07/889,626, filed May 28, 1992 for Software Controlled Interactive Video Network.

TECHNICAL FIELD

This invention relates to interactive video data processing systems and more particularly it relates to rentals of video programs to home subscribers for display on a TV set.

BACKGROUND ART

Pay per view television systems are now well known in the art. Thus, by some interactivity by the viewer, payment is arranged for a designated program and access is given to the viewer, generally in the form of a deciphering key to a scrambled transmission. In such systems copyright protection is also well known, so that one-time viewing without replay is assured, generally by preventing recording on a video recorder or by monitoring the viewers equipment for re-runs. U.S. Pat. No. 5,016,272, May 14, 1991 to J. R. Stubbs, et al. for HOME VIDEO SYSTEM describes a cable system for making available various programs for home viewing.

In the U.S. Pat. No. 4,890,321, Dec. 26, 1989 to N. Seth-Smith, et al. for COMMUNICATIONS FORMAT FOR A SUBSCRIPTION TELEVISION SYSTEM PERMITTING TRANSMISSION OF INDIVIDUAL TEXT MESSAGES TO SUBSCRIBERS, encrypted messages of limited content are sent over a satellite communication channel to an authorized receiver station. This sort of system as exemplified in related U.S. Pat. No. 4,866,770, Sep. 12, 1989 is capable of processing business transactions between a company home office and several branch offices.

However, such prior art systems are in general operable only for reception of limited length messages, or for viewing preannounced programs of greater length that are available at scheduled times for large audiences such as first run movies or sports events, and leave little flexibility for the viewer to make custom program choices at preferred viewing times. Thus, there has not been prior motivation to develop a comprehensive system for nationwide distribution upon request to individual homes of movies and like program materials of a cost effective nature for bearing the considerable cost of the several hours of air time required for custom order of a movie, and the peripheral costs of individual storage and processing of a comprehensive program source.

Even if such systems were available in the prior art, they would require at the local subscriber homes such expensive and complex intercommunication equipment that the subscriber station cost would be excessive. This is particularly true if adequate controls are in effect for protecting private communications before release with assurance against piracy. Also local subscriber systems do not conventionally have adequate communication capabilities with the program source outside of telephone line connections.

Furthermore, there has been no comprehensive custom order system for home view of movies and the like for sending the movies only to one or a few individual subscribers who wish to schedule custom ordered programs at a delivery time outside published broadcast schedules. Nor has there been facilities for downloading to the subscriber adequate information and local system control functions for placing and implementing an order. Technology changes are so rapid that there has been difficulty enabling the subscriber's facility to co-act in a program delivery system without obsolescence.

It is now feasible to provide nationwide two-way communication for interactive video data services over a satellite network for access by very large audiences as set forth in U.S. Pat. No. 5,101,267, Mar. 31, 1992 to Fernando Morales-Garza for WIDE AREA REAL-TIME T-V AUDIENCE POLLING SYSTEM WITH LOCAL AREA STATIONS LINKED BY SATELLITE. Thus, there is now a very large potential nationwide audience for requesting custom ordered video programs for home display with an interactive home response unit. Also this satellite system, as improved by that of the parent application, provides facilities for privately communicating with individual ones of a very large number of nationwide subscribers for exchange of information and for comprehensive control of a subscriber station to process external data in accordance with payment and operating condition restrictions imposed upon the transfer of data.

It is therefore an object of this invention to provide a satellite transmission system for renting program materials such as full length movies from a comprehensive warehouse of materials that can broadcast special programs upon request to individual subscribers.

It is a further object of the invention to provide an interactive video data processing system with a nationwide audience having the capacity to deliver custom ordered full feature programs such as movies to individual subscribers upon demand.

Another object of the invention is to provide a system for downloading custom ordered movies and the like from a central storehouse facility to one or more selected subscribers in a nationwide network together with adequate subscriber system controls for decrypting, controlling unauthorized copying, notifying the subscriber of delivery times, confirming an order and other related interactive communications related to the transaction.

A still further object of the invention is to provide at a reasonable price custom rental of unscheduled movies and full length programs to home television viewers.

Other objects, features and advantages of the invention will be found throughout the following description, claims and accompanying drawings.

DISCLOSURE OF THE INVENTION

Movies and other featured video programs are stored in a storage and processing rental center for encrypted electronic nationwide satellite distribution upon demand by a single subscriber, or a small group of subscribers sharing costs, for a private viewing. By means of the cost sharing feature, the costs for the private viewing may be shared to provide competitive rental fees for processing, transmission and royalty costs involved for custom rental of unscheduled programs at the convenience of the subscribers.

Transactions for ordering, paying, receiving a decryption key, scheduling and providing a receipt, etc. are made over a two-way interactive wireless satellite network in communication with a nationwide network of subscribers and the video program storage and distribution center. Software controlled subscriber stations in the interactive network permit the monitoring and control of the private viewing conditions at the subscriber's home television set to meet various copyright and recording and sales policy criteria. Basically the subscribers are interactive network participants who have the flexibility with a relatively low cost interactive television control unit to process orders and privately view a rented video program, all without additional or special purpose hardware facilities. This is achieved in a software controlled subscriber station, by means of downloading software controls for the movie rental transaction and implementation from the network central control facility.

The video program is preferably transmitted in digital format, and thus may be easily stored at the subscriber station in encrypted format for a single private viewing session at a time chosen by the subscriber. Thus, special purpose single-shot local control software may be downloaded from an interactive network processing center to the ordering subscriber station for implementing an order for a private decrypted viewing session of a desired movie or other video program, where the software self destructs after the single viewing, thereby conforming with licensing of copyrighted materials for a single in-home viewing session.

The interactive network provides optimal communication of catalog choices, pricing, delivery conditions, automated storage, viewing schedules, payment, confirmation of orders, and conformation to changes in technology, business procedures or delivery conditions between the storage and distribution source and the subscriber station. The interactive network control center is already fashioned to interactively communicate between vendors and subscribers and to process payments. Its computer controlled capacity can implement new procedures with appropriate software programming. Thus, there is little added hardware necessary in the aforesaid already known software controlled interactive network facility for administrating the present system. Accordingly, an efficient system is provided wherein the movie vendor need not implement a system or require hardware purchases for reaching and communicating with a very large body of potential subscribers, or for servicing rental orders. The rental center simply arranges for encrypted broadcast over available satellite channels of ordered programs with notice to the customers of acceptance of the order and the broadcast time and channel. This is a routine matter in the basic background interactive system already set up to interactively react with various vendors of services and goods.

BRIEF DESCRIPTION OF THE DRAWINGS

In the accompanying drawings, wherein similar reference characters in the several views relate to similar features for facilitating comparison, and wherein:

FIG. 5 shows a representative set of menus presented on the subscriber's television screen during the course of the ordering and implementing of a private movie viewing.

THE PREFERRED EMBODIMENTS

Figure 1:
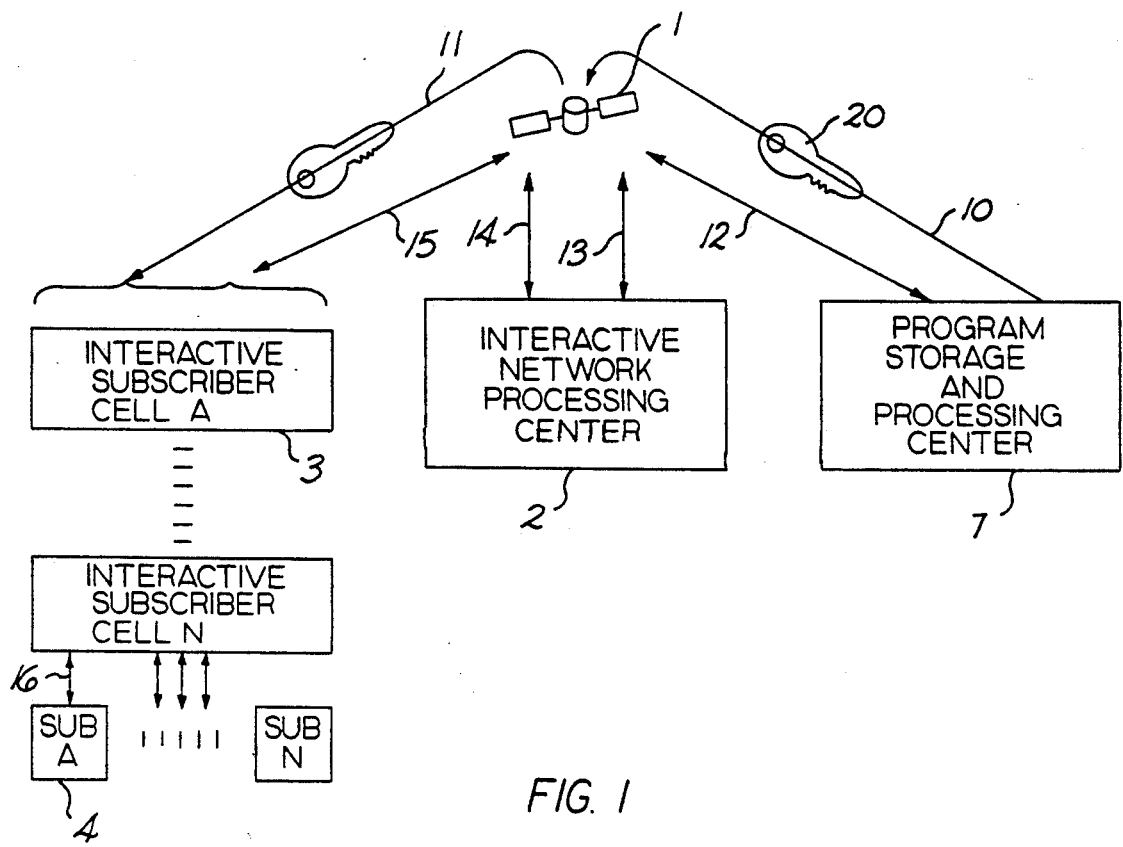
FIG. 1 is a general system block diagram of the video data exchange network afforded by this invention.

This system, as seen from FIG. 1, provides for two parallel wireless communication channels 10, 11 and 12, 13, 14, 15 over one or more satellites 1 respectively for transmitting video programs and interactive communications between the program storage and processing center 7, source of movies and like video program materials, and the subscriber stations 4, from which stored programs may be custom ordered for private viewing as unscheduled events. Local subsets of subscribers 4(A-N) communicate in the network by means of the various regional cells 3, so that a nationwide network can process concurrent communications from a large number of individual subscribers in substantially real time as set forth in said U.S. Pat. No. 5,101,267.

The key 20 represents encryption of the video programs broadcast in one direction (noted by the arrowheads) from the program processing center 7 and satellite 1 for reception by the cells 3 and distribution to a selected subscriber station 4. Thus, the satellite 1 may efficiently transmit a large number of channels having video production bandwidths, with several set aside for unscheduled video transmissions of the nature herein transmitted to give prompt turnaround times between verified orders and broadcast times. The cells have the capacity to receive the satellite channels and relay programs locally to the subscribers, thus precluding the necessity for satellite reception hardware by each subscriber.

The interactive two-way communication links 12-16 between cells 3 and subscribers 4 permit full communications over the interactive network stations, cells and centers, and typically employ the technology of U.S. Pat. No. 4,591,906, May 27, 3986 of Fernando Morales-Garza, et al. for WIRELESS TRANSMISSION FROM TELEVISION SET TO THE TELEVISION STATION, at least in the link 16. In this manner, each of a very large number of subscribers 4A-N located in widely dispersed cell regions is individually identifiable for two-way digital communication. The communications may be carried implicitly in regularly scheduled television programs, or may be carried separately on a narrow band width modulated carrier channel, each of which is compatible with transmission over a communication channel of the satellite 1. Thus, the basic requirements for the various functions and features of the present invention found hereinafter are set forth in this simplified system configuration.

Figure 2:
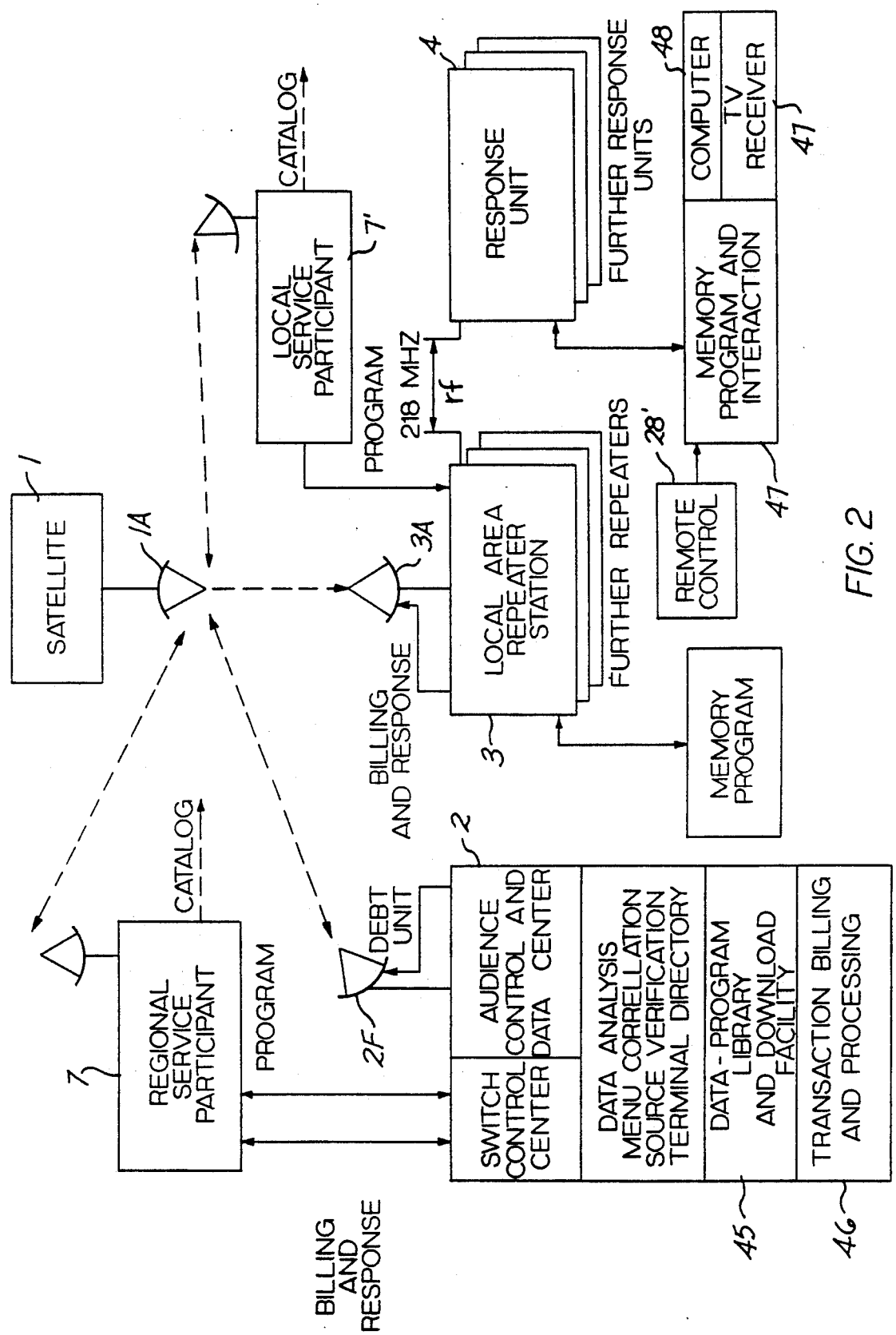
FIG. 2 is a more detailed block diagram illustrating the interactive role of the network control center in communicating and implementing movie rentals in accordance with the invention.

For understanding of relevant processing features afforded the interactive network control and data center 2 of the current invention, reference is made to FIG. 2, excerpted from the foregoing parent application, the remainder of that disclosure being incorporated herein by reference. Note that there is an interactive control unit 47, having memory and software programming for associated data processor 48 and television receiver 49 incorporated in the subscriber home response units 4. The interactor feature 47 provides comprehensive interaction with the data center 2 for exchange of messages, data and program software. The memory feature 47 is sufficient for downloading of digital data including video movies and programs in digital format. Auxiliary local response unit equipment (not shown) includes video recording equipment(VCR) for interactively recording programs in conventional television format. Among the usual interactive home unit features are the display of menus in a menu driven interactive mode as directed by selection from a manually operated remote control unit 28. The software programs by way of computer 48 make the subscriber station response unit universally adaptable to different features and control functions in the interactive communication mode, and in a local operating mode. The local operating mode for example includes the ability to display program schedule menus from which programs may be automatically be tuned in from their respective channels for viewing or recording on a VCR. Menus also can be presented by TV advertisers for interactive participation in polls and purchase transactions. Catalogs and other data may be ordered down from the data center 2 for viewing. Thus, typically a simple menu choice at the response unit 4 can enter an order, arrange for credit card payment, receive verification of the order and send a local or regional service participant 7 the delivery address.

In this interactive system environment, features particularly relevant to the present invention are the downloading of data and software programs 45, and the transaction billing and processing 46 features, which implicitly include the data center ability to communicate with individual subscribers 4 and vendors 7 with privacy assurance message encryption. All this covers a nationwide audience of subscribers made possible by the two-way wireless communications through satellite 1.

Figure 3:
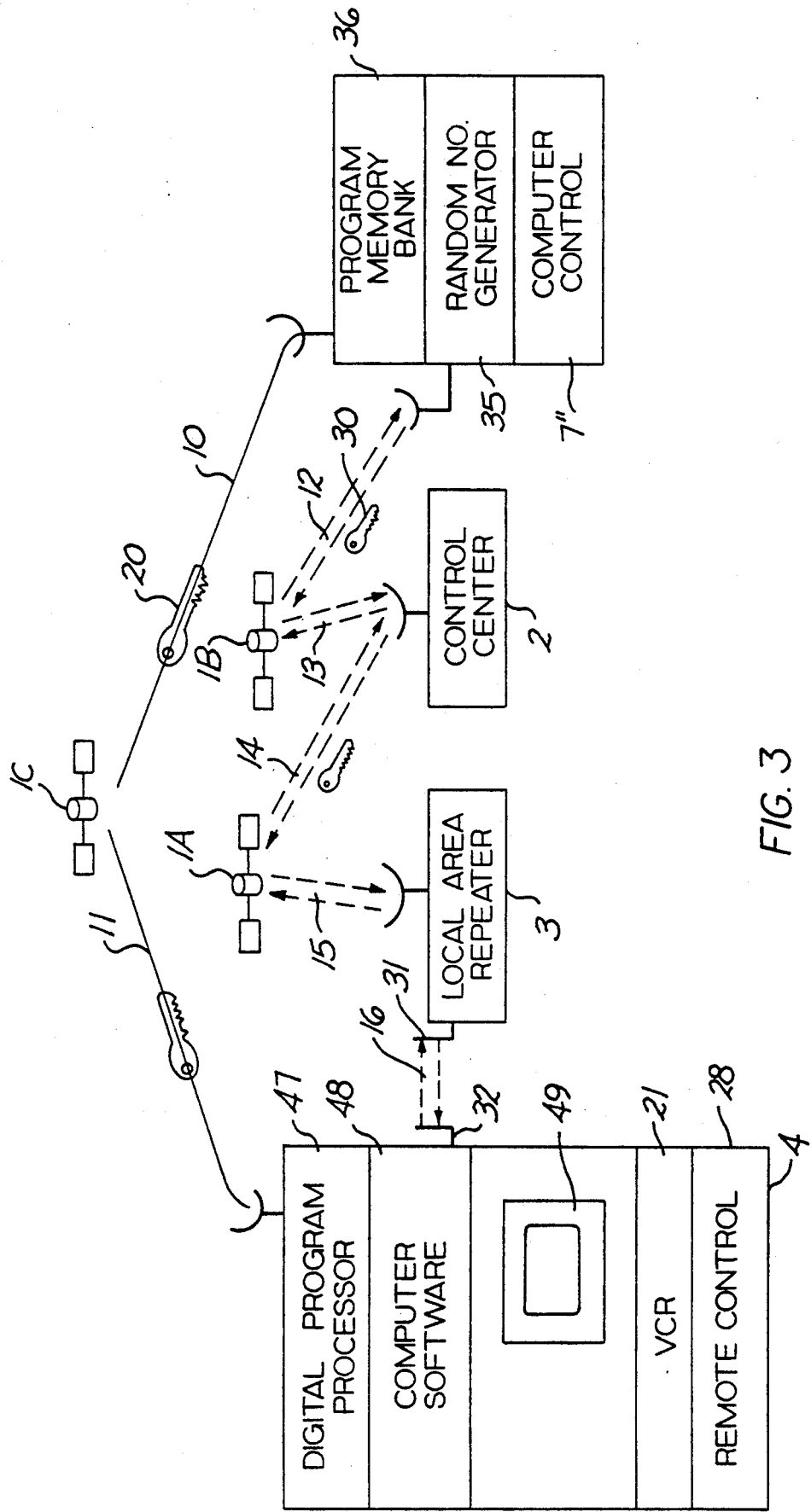
FIG. 3 is a preferred block diagram embodiment showing in greater detail the video data exchange network of this invention.

In FIG. 3, the subscriber response unit 4 is shown in block diagram format with an accompanying TV receiver 49, computer 48 with software controls, a local control system for processing digital programs 47, a remote control unit 28 and a VCR unit 21. Note that the two-way communication links 12-16 are broken down into two single direction channels identified by arrow heads to show the communicating direction. The keys 30 represent the downloading of a unique deciphering key in response to a completed rental transaction for each custom ordered program for private viewing, as allocated by the random number generator 35 at the program distribution computer controlled center 7''. With the deciphering key 20 removed from the program, and transmitted at a different time, and encrypted in a different manner in the separate interactive channel communications, the security against piracy is formidable.

The communication links 10-15 may use different satellites 1A, 1B, 1C, or equivalent wireless communication links of a single satellite to meet the needs of the various communicators and to assure enough channels in the separate satellite 1C for custom viewing without significant waiting time delays. The link 16 between the repeater cells 3 and the subscriber home units 4 is preferably a 218 MHz link conforming with FCC standards for interactive video data service activities.

This system accordingly permits the subscribers to determine what programs are available from the vendor's memory bank 36, to process a custom order for receiving a private viewing over communication link 10-11, and to decrypt using key 30 and privately view the ordered program at home on the TV receiver 49. However, the system contains other features pertinent to the downloading of software programs, which follow.

Figure 4:
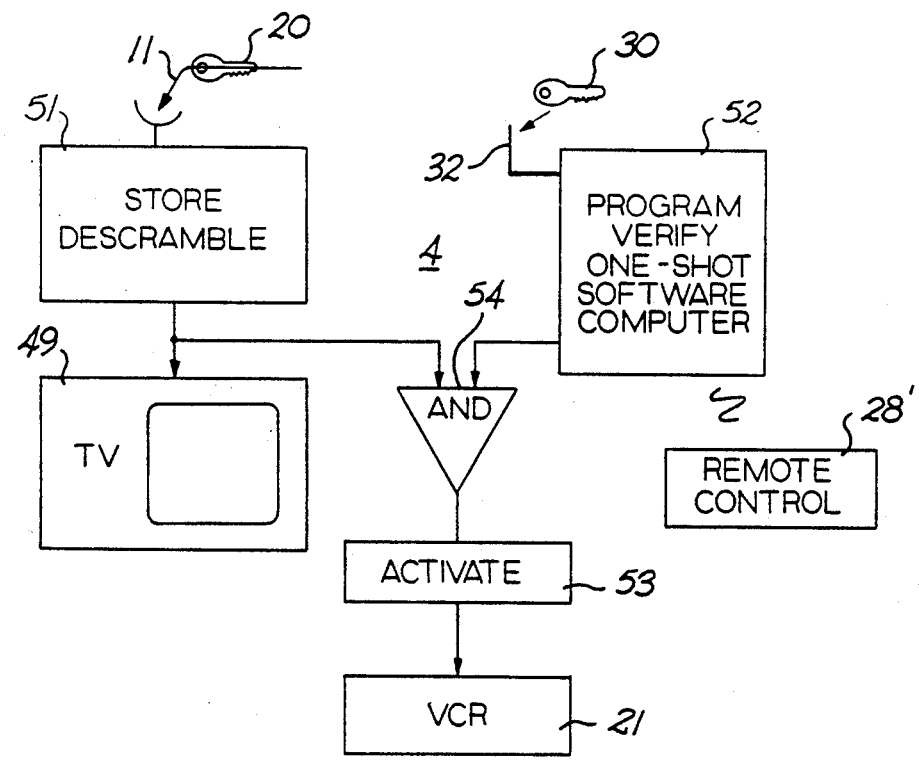
FIG. 4 is a fragmental block diagram embodiment illustrating the private viewing of a movie in accordance with this invention.

In FIG. 4 is a typical embodiment of the subscriber home response unit 4 exhibiting the feature known in the art as "copyright protection" for monitoring the conditions under which a downloaded program licensed for restricted use conditions may be viewed. In the comprehensive system of this invention various types of video rental or purchase agreements may be processed. However, a typical rental agreement for a current first run movie or sports event is a one-shot private viewing of an ordered program which is paid for in advance through a credit card transaction or the like. With subscriber access to program materials, which could be converted for unauthorized use of a downloaded program such as first run movies or currently unscheduled major sporting events available from the program source.

The program downloaded on communication link 11 encrypted with key 20 is stored at the subscriber station either in digital, analog, encrypted or decrypted format in accordance with a preferred style of system operation. Assume for this embodiment that the encrypted program is stored at 51 to be descrambled with key 20 under control of software section 52 at the viewers convenience, as commanded from the remote control unit 28. To assure a single viewing, the one-shot software of section 52 is downloaded from the interactive data control center. This software is programmed to self destruct and erase after one viewing. Although a software expert might divert and pirate a single program by writing special software for the subscriber home unit computer, the time taken and cost for decrypting would be so high compared to the cost of rentals that there would be little motivation. Furthermore, the software from the data center can be changed frequently, and the random number key 30 is unique to a single program, so that in effect there is a maximized security in this system against piracy. If permitted by the prepayment of a recording license fee, for example, the software can also activate via control section 53 the VCR 21 for recording the program in decrypted analog format as indicated at AND circuit 54.

This system affords ample facility for communications between the program vendor and the subscriber, and full interactivity of the subscriber at the home unit. The interactive menu displays of FIG. 5 represent typical interactive features of the system. Thus menu 5A may be interactively viewed while browsing through available catalog offerings of rental programs. The typical classical movie "Gone With The Wind" is illustrative of a choice that may be offered. The various options A, B, S, X are shown for placing an order by menu choice. In this case the VCR copy option X is given with its price addition to the custom order private viewing prices A, B and S. The shared-price feature of this invention is illustrated for groups of twelve and 125 participants.

Even with efficient and automated electronic systems and satellite transmission channels, the peripheral broadcast time, license fee and processing costs for the private viewings are significant enough that the audience for a private solo viewing is small, particularly if licensed only for home use. Of course, group usage for private showings may be licensed as well. The advantage of a solo order is that a preferred date and time viewing becomes more feasible, in essence depending only upon the distribution of traffic on the satellite channels operated by the program vendor. Note that the preferred date and time may be interactively entered.

However, to accommodate larger audiences, shared-cost options in multiple home groupings are available, such as twelve member groups B or 125 member groups S (already on order with 63 participants). The catalog menu may be kept updated currently if downloaded for browsing from the data center, thus to include such other information as expected viewing date. The software controlled computer at the data control center will process the orders and communicate with the vendor to arrive at a viewing schedule when the group is assembled.

The menu of FIG. 5B will reflect any pending and scheduled programs monitored by the subscriber station computer under control of its interactive software options. Thus, it may be seen that immediately after placing an order, the "Pending" selection "Gone With The Wind" is listed with the updated group count and estimated time of scheduling. A fully scheduled program will identify the channel and date as illustrated by the "Olympics" entry. Interactivity options at the subscriber station will usually permit these programs to be automatically recorded when received for viewing at the subscriber's timing. As seen on the updated schedule of FIG. 5C, the time and channel is displayed for the "live only" single shot performance private viewing that has been ordered. In such cases the local software provides for processing the decryption while the program is being viewed. A timed reminder alarm may be sounded at the start of the program.

In the present system, the advantages of software-computer control of interactivity are significant. For example, there is no special hardware cost to participate in the program rental system of this invention either at the subscriber station or the central data control station. The central station with a nationwide audience thus can provide software for system operation and downloading into the subscriber station at low peruse cost to the participants, and the processing fees for the various communications are reflected in the rental prices agreed upon, if not already a part of an optional feature licensing agreement with the central data system by the subscriber. In such cases, a discount figure may be included on the pricing menu for the subscriber's information.

Figure 6:
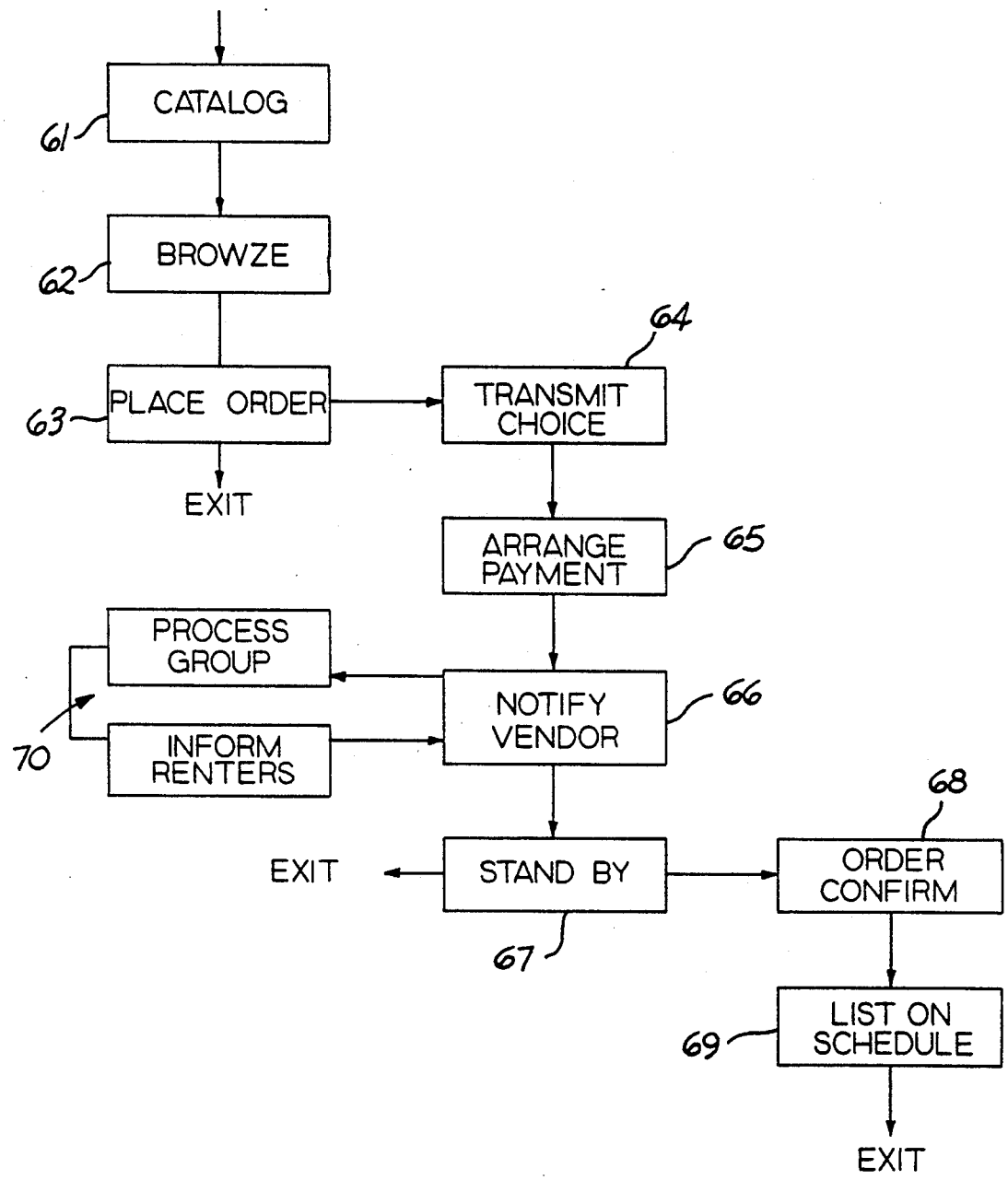
FIG. 6 is a generalized data flow block diagram illustrating the role of software in the ordering and implementing of a movie for private viewing in accordance with this invention.

The software downloaded from the interactive data control center for implementing the subscriber transaction for rental of a video program in accordance with this invention can take various forms and include different options. It is readily within the skill of the art to produce the software to implement the features disclosed by this invention. Depending upon the local subscriber unit interactivity features incorporated in a conventional operating protocol, the local subscriber software may either be integrated, or replaced with an overriding rental transaction program. In any event, the generalized block flow diagram of FIG. 6 is illustrative of the combined subscriber station and interrelated data control center software which converts a software controlled interactive subscriber system into a special purpose system for providing the desirable operation features in accordance with this invention.

Thus, if a current catalog of available rental programs is requested for downloading from the data center at step 61, it may be browsed at 62 to determine if a rental order is to be placed. The catalog may have available rentals listed in a format of the nature of FIG. 5A, for example, from which an order is placed at step 63. If no order is placed then the program is exited. Otherwise the choice is transmitted back to the data center for processing at step 64. After payment is verified and set aside at step 65, the vendor is notified at 66. The step 65 may include at the data center provisions for filling a group order before fully notifying the vendor with information including update of the catalog to permit browsers to join the groups being formed, and downloading of communications to the subscriber for updating local program schedules. Thus the processing loop 70 is provided.

Because of the real time wireless interactive communication network that does not have to confirm through telephone exchanges, the standby step 67 can await for an immediate confirmation of the order and scheduling of viewing time from the vendor at steps 68 and 69 to be communicated and downloaded to the ordering subscriber through the interactivity data control center.

The data control center software before the notify vendor step 66 may defer to the group assembly software loop 70, which keeps the purchaser aware of progress and postpones the final vendor notification of a scheduled viewing time after the necessary number of group members make verified purchase transactions. It is clear that the software will be written to conform with the local subscriber station status, which is maintained as a matter of record at the central station as to features including credit card payment status, identification for private connection for transfer of the decoding key at step 68, etc.

Therefore this invention provides improved systems and methods for electronically renting video programs available from a program storage center for custom viewing at a subscriber's home television set. Accordingly those features of novelty setting forth the nature and spirit of this invention are defined with particularity in the following claims.

I claim:

1. An interactive wireless video data exchange network, comprising in combination
    a plurality of separated subscriber stations located in different geographic areas having facilities for viewing video programs,
    a video program storage and processing center for providing selected unscheduled video programs to individual ones of the subscriber stations for viewing,
    distribution means for transmitting said video programs over a satellite network between said program center and said subscriber stations in a format for storage at a requesting subscriber station,
    an interactive network processing center for interactively communicating with the subscriber stations and the program center, and
    interactive communication facilities at the subscriber stations comprising a television viewer including means for interactively processing and implementing wireless transactions with the program center and storing selected video programs for private viewing.

2. The interactive network of claim 1 further comprising:
    a set of geographically separated video processing cells, each for communicating interactively with a local subset of said subscriber stations and said interactive processing center, and
    communication means at the video cells for processing communications between individual ones of the subscriber stations in its local subset and the interactive network processing center.

3. The interactive network of claim 1 further comprising,
order processing means at the subscriber station for custom ordering of and payment for a selected program stored at the program processing center for private transmission.

4. The interactive network of claim 3 further comprising, facilities for accumulating from different participating subscriber stations a predetermined number of custom orders for a particular stored program at a cost payment shared by the participating subscriber stations and for private transmission of said particular stored program to authorized participating stations at a predetermined time.

5. The interactive network of claim 1 further comprising,
separate wireless satellite communication channels for interactively communicating and distribution of said video programs, and encryption means for encrypting each private viewing of a video program with a unique encryption key.

6. The interactive network of claim 1 wherein said distribution means further comprises means for transmitting said video program in digital format for local storage by the subscriber.

7. The interactive network of claim 1 wherein said interactive communication facilities at the subscriber stations further comprise subscriber station interactive control means including a software controlled data processor, an interactivity control system operated by said software controlled data processor, and means for changing software programs for implementing a diverse range of interactive functions.

8. The interactive network of claim 7 wherein said interactive network processing center further comprises means for downloading software programs to individual subscriber stations.

9. The interactive network of claim 8 further comprising,
software downloaded from said network processing center to a requesting one of said subscriber stations providing for limited private viewing conditions at the subscriber station of a custom ordered program distributed over the satellite network from said program center.

10. The interactive network of claim 9 further comprising at said subscriber stations, software controlled facilities for recording a video program for private viewing distributed by said program center for a single video reproduction at an authorized subscriber viewing station.

11. The interactive network of claim 7, wherein said subscriber stations further comprise software controlled facilities for implementing and paying for a private viewing of a video program for distribution over said satellite network from said program processing center.

12. The interactive network of claim 11 further comprising,
encryption means at said program processing center for uniquely encrypting different individual video programs designated for private viewing with a randomly generated encryption key, and
processing means at said interactive network processing center for controlling a transaction and delivering a decryption key obtained from the program processing center to an authorized subscriber station for receipt of the encrypted video program.

13. The method of releasing video programs from a video storage and distribution center for private viewing of a subscriber, comprising the steps of:
transmitting for private viewing from said distribution center over a satellite broadcast channel encrypted video programs having unique encryption keys for each private viewing, and
transmitting from the distribution center over a wireless two way interactive network channel coupled with an authorized subscriber station the unique key for decrypting the broadcast video program together with order confirmation data.

14. The method of claim 13 further comprising the step of
processing over the interactive network channel catalog menu data for subscriber selection of video programs available for private viewing.

15. The method of claim 13 further comprising the steps of
accepting orders for a shared cost private viewing of a video program from a set of subscribers over said interactive network channel by said distribution center, and
transmitting to each of the subscribers in said set over said interactive network channel the unique key for decrypting the shared cost private viewing video program.

* * * * *